United States Patent [19]
Minihan

[11] Patent Number: 5,824,135
[45] Date of Patent: Oct. 20, 1998

[54] HIGH VOLUME AIR-WATER SEPARATOR

[76] Inventor: Thomas J. Minihan, P.O. Box 15310, Houston, Tex. 77220-5310

[21] Appl. No.: 757,342

[22] Filed: Nov. 27, 1996

[51] Int. Cl.$^6$ .................................................. B01D 19/00
[52] U.S. Cl. ................................. 95/24; 95/260; 95/266; 95/272; 96/165; 96/189; 96/193; 96/406; 96/409; 55/417
[58] Field of Search .............................. 55/215, 216, 219, 55/417, 319, 320, 321; 95/24, 260, 266, 272; 96/165, 182, 189, 193, 220

[56] References Cited

U.S. PATENT DOCUMENTS

| | | | |
|---|---|---|---|
| 2,555,452 | 6/1951 | McIntyre | 55/216 |
| 2,710,666 | 6/1955 | May | 55/216 |
| 2,929,503 | 3/1960 | Ambruster, II et al. | 96/165 |
| 3,130,023 | 4/1964 | Hasselberg | 55/219 |
| 3,283,477 | 11/1966 | Kasten | 96/182 |
| 3,296,776 | 1/1967 | Youngman | 96/189 |
| 3,306,007 | 2/1967 | Glasgow | 96/189 |
| 4,055,405 | 10/1977 | Thun-Hohenstein | 55/216 |

FOREIGN PATENT DOCUMENTS

| | | | |
|---|---|---|---|
| 25388 | 11/1930 | Australia | 96/165 |
| 1132876 | 7/1962 | Germany | 55/216 |
| 1703906 A1 | 1/1992 | U.S.S.R. | 96/189 |

*Primary Examiner*—C. Scott Bushey
*Attorney, Agent, or Firm*—Gunn & Associates, P.C.

[57] ABSTRACT

This invention consists of apparatus and methods for separating fluids of differing specific gravities, and more particularly apparatus and methods for separating a high volume flow of fluid comprising a mixture of air and water into an essentially dry air component and a pure water component. The separator is high volume and is structured around three physical elements which are defined as an input, a water chamber and an air separator chamber. A composite flow enters the input where most of and flows into the water chamber. The remaining fluid, which is air and water in the form of vapors mist, or droplets, is drawn into the air separator chamber using a vacuum pump, and subsequently flows through a condensate sub chamber which physically is an element of the air separator chamber. Any moisture in this flow is condensed within, and drained from, the condensate chamber such that dry air is discharged from the air separator chamber.

16 Claims, 4 Drawing Sheets

FIG. 4d
FIG. 4c
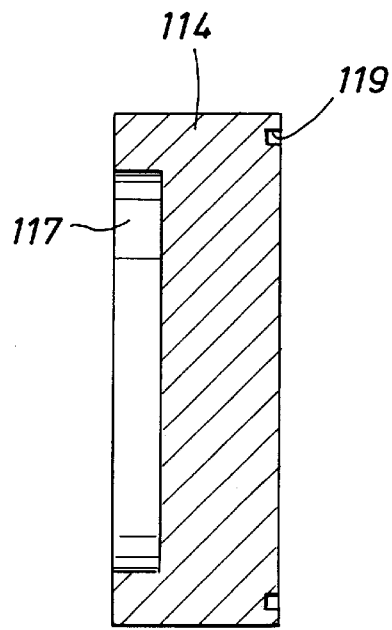
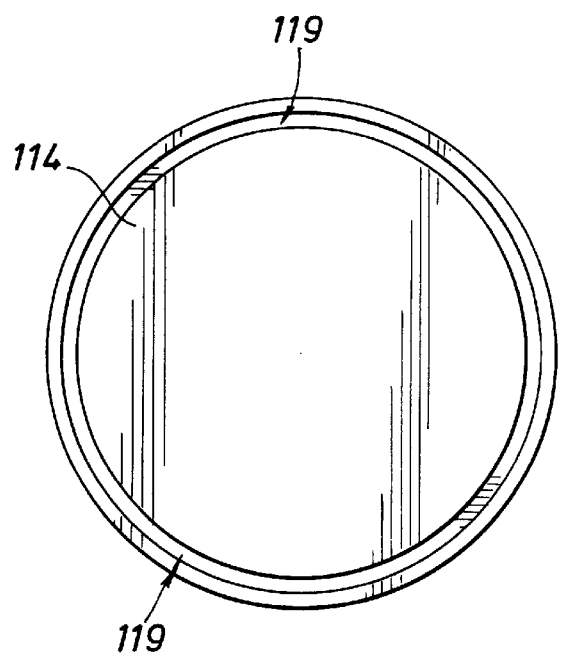
FIG. 4e
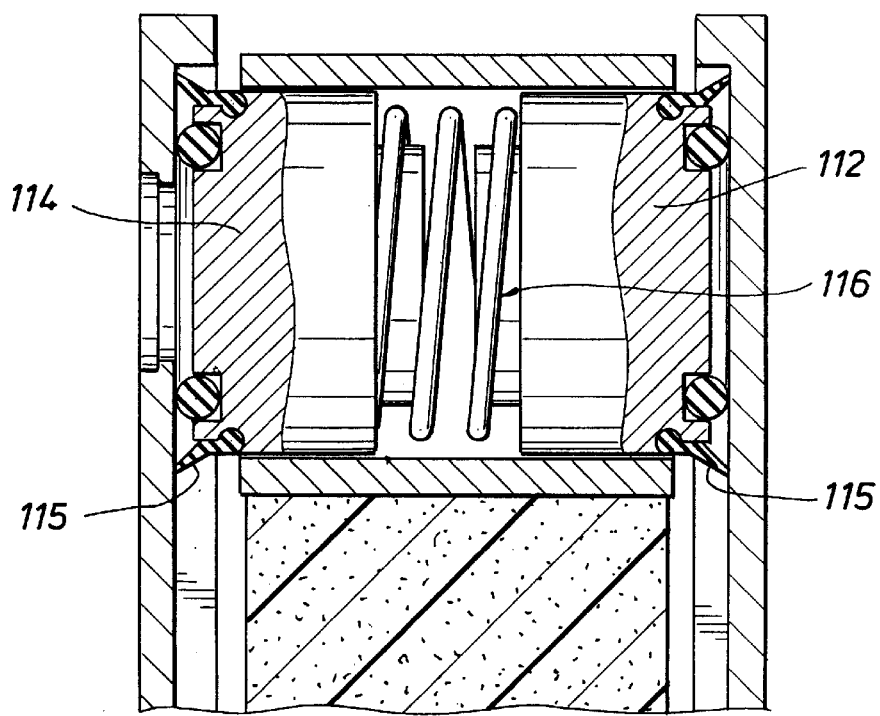

HIGH VOLUME AIR-WATER SEPARATOR

BACKGROUND OF THE INVENTION

1. Field of the Invention

This invention is directed toward apparatus and methods for separating fluids of differing specific gravities and more particularly directed toward apparatus and methods for separating a high volume flow of fluid comprising a mixture of air and water into an essentially dry air component and a pure water component.

2. Background of the Art

Many industrial, scientific and operational procedures require the separation of a composite fluids into components of differing specific gravity which comprise the composite.

The oil and gas industry is based upon the production of liquids from the earth which usually consists of a mixture of liquid and hydrocarbon gas. Furthermore, the liquid usually consists of a mixture of hydrocarbons (oil or gas condensate) and water (fresh or saline). The produced fluid must be separated not only to recover commercial quantities of hydrocarbon in the liquid and gas phases, but also to render the byproduct (produced water) in a form in which it can be disposed of in an economically and environmentally acceptable manner. The chemical, pharmaceutical, food and countless other industries employ apparatus and methods for separating composite fluids into their components or "phases" of differing specific gravities. In most commercial separation procedures, it is economically desirable that the procedure be "high volume" in that large quantities of composite fluid can be separated in a relatively short period of time. It is also desirable that the separation apparatus be relatively inexpensive to fabricate, maintain and operate.

Scientific research often requires that composite fluids or slurries be separated into components of differing specific gravities. Often, separation of components of almost equal specific gravity is required. In most scientific separation procedures, precision and accuracy are the primary criteria, and the rate at which separation occurs is usually secondary. Although it is desirable to minimize the cost of scientific separator equipment fabrication costs, maintenance cost and operation costs of this equipment is usually not as critical as in the case of commercial separator equipment.

Numerous manufacturing and production operations involve the separation of composite fluids into gas and liquid components. As discussed previously, hydrocarbon production requires the separation of gas and liquid hydrocarbons, and the further separation of water from the produced fluid. Operationally, water separated from liquid hydrocarbon must meet certain regulatory standards before the water can be discharged into bodies of surface water or reinjected into an underground earth formation. Copending application Ser. No. 08/757,242 filed on Nov. 27, 1996 and assigned to the assignee of the present application discloses apparatus and methods for temporarily lowering the ground water level in the vicinity of the an excavation, such as a pipeline trench, in order to prevent the ground water from flooding the excavation. The technique involves applying a vacuum to a series of suction pipes sunk around the periphery of the excavation and sunk to a depth below the maximum depth of the excavation. The vacuum pump draws ground water from the earth in the immediate vicinity of the excavation, up through the suction pipes and into a main flow line which empties into a holding vessel. The ground water level is thereby temporarily lowered in the vicinity of the excavation, and flooding of the excavation is thereby prevented until work to be done within the excavation can be completed. Some of the suction pipes may not penetrate the level of the ground water. Furthermore, "cavitation" can occur in fluid drawn through suction pipes which do penetrate the ground water level. The result is that the fluid drawn to the surface usually consists of a mixture of water and air. It the drawn water phase is to be reinjected into the ground water tables it is usually required that it be reinjected as drawn (i.e. without air). The drawn fluid must, therefore, be separated into an air and a water component before disposal.

Gravity separators have been used commercially for decades to separate composite fluids with components of differing specific gravities. Separator tanks are typically cylindrical. Composite liquid is typically pumped into the tank where it remains for a time sufficient to allow components of differing specific gravity to separate under the influence of gravity. The separator tank has as least two outlets for withdrawing separated fluid components. For purposes of discussion, assume that the composite fluid comprises a liquid phase and a gas phase. One outlet is positioned at, or very near, the bottom of the tank and is used to withdraw the heavier liquid phase which settles to the lower portion of the tank. A second outlet is positioned at or very near the top of the tank and is used to withdraw the component of lower specific gravity which is, in this example, gas which collects at the top of the tank. It should be noted that gravity separators can contain more that two outlets, and can be used to separate composite fluids containing more that two components. A notable example is the previously discussed fluid produced by the hydrocarbon industry which typically comprises water, liquid hydrocarbon (oil and gas condensate). and natural gas. Gravity separators are considered to be "low volume" separators in that time is required for components to "gravity" separate especially if there is little difference in specific gravities. In order to increase volume through-put, gravity separators can be quite large, very immobile, and expensive to fabricate and to maintain.

Other approaches have been applied to the separation of composite fluids in order to overcome some of the disadvantages of gravity separators. One such approach involves forcing the fluid to flow, under high pressure, in a helical path thereby separating components of differing specific gravity using centrifugal force. These devices are shaped somewhat like a rifled gun barrel and are known generically, at least in the petroleum industry, as "hydroclones". Hydroclones are applicable to separating components with significantly different specific gravities, such as water and free gas. The physical size of a hydroclone require to separate a given volume of composite liquid-gas fluid is much smaller than a gravity separator required to process the same volume. As an example, an average sized person can lift a hydroclone which will process the same volume of "two-phase" fluid as a gravity separator the size of a bed room. Hydroclones are, therefore, generally considered to be "high volume" separators, at least for their relative size. Hydroclones are not, however, efficient at separating fluid components such a gas containing liquid droplets or mist.

Other centrifugal systems have been developed to separate components of fluid mixtures, wherein the specific gravities of the components differ by as little as a few thousands. These are low volume devices, and motor driven at tens of thousandths of revolutions per minute. These are typically large and very expensive to fabricate, operate, and maintain. As a result, these separators are more ideally suited for scientific applications, of for specialty type manufacturing processes.

In summary, some separator technologies available in the prior art are directed toward low volume output, or are required to be physically large and very immobile for high volume output. The gravity separator is an example of this technology. Other technologies are directed toward high volume output but require substantial differences in specific gravities of the components. The hydroclone separator is an example of this technology. Still other technologies are directed toward precise and accurate separation of fluid phases with slightly differing specific gravities, but are expensive to fabricate and to maintain and to operate. The centrifugal separator is an example of this technology.

An object of the present invention is to provide apparatus and methods which can separate high volumes of composite fluid into components of significantly differing specific gravity such as air and water.

An additional object of the present invention is to provide apparatus and methods for extracting the gas component from a gas-liquid composite fluid, wherein the gas component is essentially free of liquid and therefore considered "dry".

A further object of the present invention is to provide apparatus to meet the previously defined objects, wherein the apparatus is physically small, mobile, and relatively inexpensive to fabricate, to operate and to maintain.

A still further object of the present invention is to provide apparatus to meet the previously defined object which is rugged and highly reliable from an operational viewpoint.

There are other objects and applications of the present invention which will become apparent in the following, disclosure.

SUMMARY OF THE INVENTION

The high volume separator presented in this disclosure is structured around three physical elements which will be defined as an input, a water chamber and an air separator chamber. The function of each element, the functional relation between the elements, and other components of the system will be summarized in the following section.

Composite fluid enters the separator at the fluid input. Composite fluid is delivered to the input, under pressure, by any suitable conduit such as a pipe. For purposes of discussion, it will be assumed that the composite fluid to be separated consists of a water phase and an air phase. It should be understood, however, that the composite fluid can consist of any liquid and any gas.

The water chamber is mounted below the input, and a flow path exists between the input and the water chamber. Connection is preferably made with industry standard flanges. As the fluid enters the input, the heavier water component tends to initially separate under the force of gravity and collect in the water chamber which is positioned below the level of the input. Water is discharged from the water chamber preferably by means of a water pump. The input of the water pump is connected to the water chamber by means of a suitable conduit, such as a hose or pipe, at a water chamber outlet. Connection is preferably made using industry standard flanges. The water chamber outlet is located at a level at or near the bottom of the water chamber such that most or all of the water collected within the chamber can be directly purged by the action of the water pump. The water chamber is preferably, but not necessarily, cylindrical in shape.

The air separation chamber is mounted at a level above the fluid input, and a flow path exists between the input and the air separation chamber. As the composite fluid enters the separator at the fluid input, the lighter air component tends to separate and is drawn into the elevated air separation chamber preferably by a cooperating vacuum pump. Water can also enter the air separation chamber depending upon the fraction of water in the composite fluid (i.e. the water "cut" of the fluid), the volume input rate of the composite fluid, the rate that water is being purged from the water chamber by the water pump, and the rate at where air is purged from the air separation chamber as will be discussed subsequently. Furthermore, the air as it enters the air separation chamber is not "dry", but is "moist" in the sense that it still contains a significant amount of water in the form of vapor, mist or droplets.

The moist air within the air separation chamber is forced to flow, by means of a serpentine path, through a condensate chamber within the air separation chamber. The condensate chamber contains material which removes or "condenses" the remaining water from the moist air. This material is preferably spongy, open cell spheres closely packed within the condensate chamber to force, along with a baffle, the air to follow a tortuous, serpentine path. Moisture collects on these balls, and drains, under the force of gravity, to the bottom of the condensate chamber where it is removed by means of a drain located at or near the lowest elevation of the condensate chamber. Dried air is then purged from the condensate chamber portion of the air separation chamber by means of a vacuum pump. The vacuum pump connects to the condensate chamber by means of a suitable conduit, such as a hose or pipe, at an air outlet fitting which is positioned near the top of the condensate chamber. Connection is made preferably using industry standard flanges.

As mentioned previously, water in the contiguous liquid phase can enter the air separation chamber, depending upon input fluid water cut, input fluid volume rate, water output rate, and dry air output rate. If the level of this water were allowed to rise unchecked within the air separation chamber, it would eventually enter the condensate chamber thereby negating the air drying properties of this "sub" chamber. To prevent this, a float and valve arrangement is employed within the air separation chamber. The float "rides" on the level of any contiguous water that might enter the air separation chamber. If the water level within the air separation chamber rises above a predetermine level, the float moves upwardly within the chamber to an extent that it closes, by means of a valve, the flow path between the main air separation chamber and the condensate chamber. This terminates moist air flow into the condensate chamber. More importantly, valve closure prevents any contiguous water from flowing into the condensate chamber. Stated another way, flow from the separator input into the air separation chamber is temporarily halted after compression of air within the main air separation chamber generates a pressure equal to the input fluid pressure. Flow is automatically restarted when the water pump can purge sufficient water from the water chamber, the abnormally high water level within the air separation chamber falls, the position of the float likewise falls such that the valve again opens the flow passage between the main air separation chamber and the condensate chamber.

The air separation chamber is preferably cylindrical in shape, and tapers in a conical form to a standard flange fitting at the separator input. Details of the float and valve assembly will be discussed in detail in a subsequent section of this disclosure. The separator is typically about three feet in height and two feet in diameter. This results in a very light, portable separator which, for its size, handles a very high volume of composite fluid. Essentially all moisture is removed from the separated gas, which is air in the previous discussion. The entire separator is inexpensive to fabricate as will become apparent in the following detailed description of the preferred embodiments of the invention. There are few moving parts which minimizes maintenance costs and increases reliability. The separator is also very rugged and suitable for all types of harsh environment applications.

BRIEF DESCRIPTION OF THE DRAWING

So that the manner in which the above recited features, advantages and objects of the present invention are attained and can be understood in detail, a more particular description of the inventions briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 4c is a front view of a valve disk clearly illustrating a peripheral O-ring groove;

FIG. 4d is a view of a valve pad illustrating a spring seat; and

FIG. 4e is an alternate seal to the version of FIG. 4d.

DETAILED DESCRIPTION OF THE PREFERRED EMBODIMENT

Figure 1:
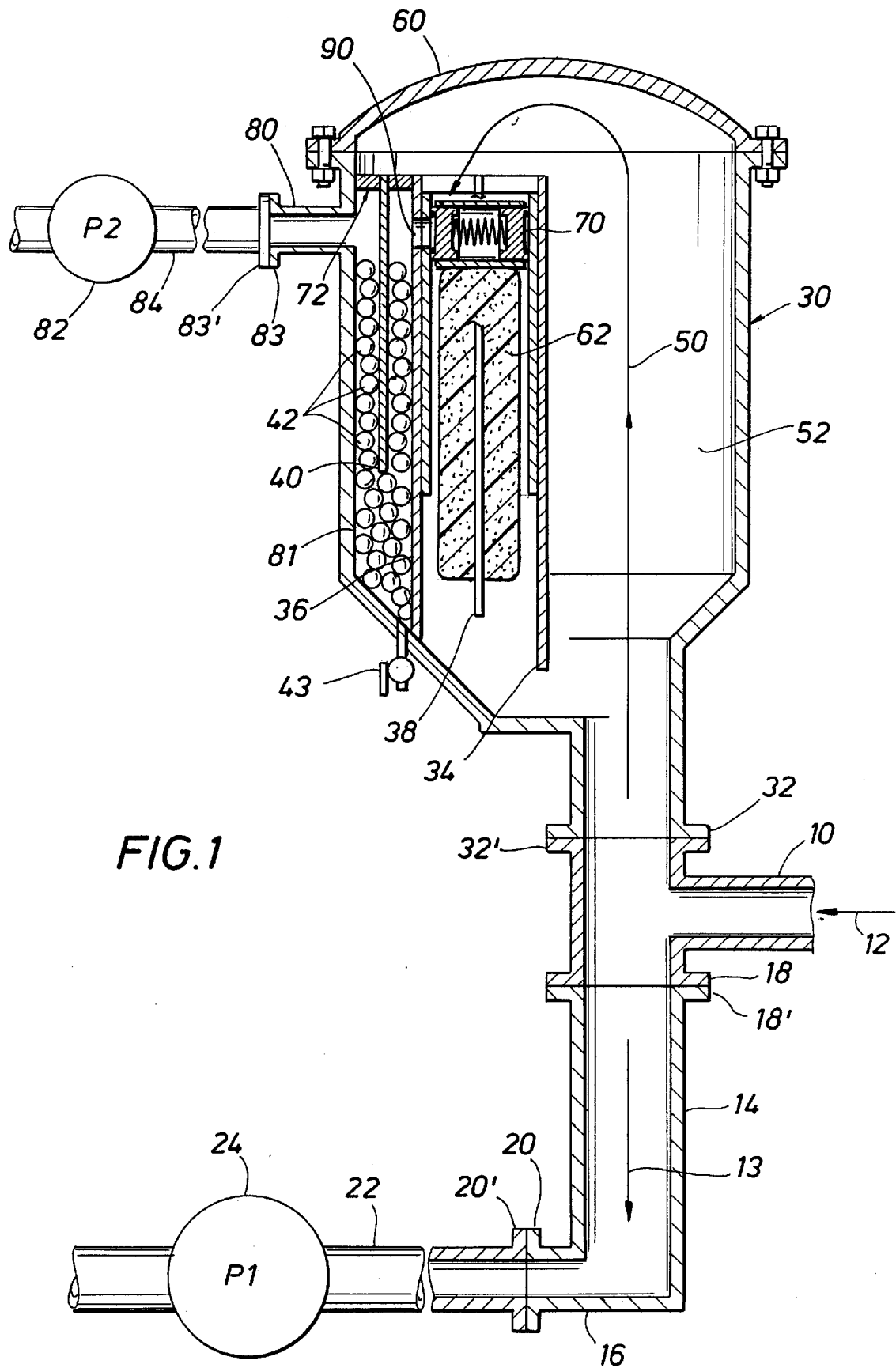
FIG. 1 is a side sectional view of the separator unit and also shows the cooperating water pump and vacuum pump.

Attention is directed to FIG. 1 which shows a cross sectional view of the separator. This view is designed to present an overview of the elements of the separator and to illustrate their functional operational relationships. More detailed views of the invention will be presented in subsequent drawings and discussed in detail.

Again referring to FIG. 1, the composite fluid input is identified by the numeral 10. Composite fluid, conceptually illustrated with the arrow 12, is delivered to the input 10 by any suitable conduit such as a pipe or hose. A water chamber 14 is attached to the lower side of the input 10 by means of the preferably industry standard flanges 18 and 18'. A flow path exists between the input 10 and the water chamber 14 through these flanges. As the fluid (represented by the arrow 12) enters the input 10, the heavier water component, represented by the arrow 13, tends to initially separate and flow under the force of gravity and collect in the water chamber 14. Water is pumped from the water chamber by means of a water pump 24. The input of the water pump is connected to the water chamber 14 by means of a suitable conduit 22, such as a hose or pipe, at a water chamber outlet 16. Connection is preferably made using industry standard flanges 20 and 20. The water chamber outlet 16 is located at a level at, or near, the bottom of the water chamber 14 such that most or all of the water collected within the chamber can be directly purged by the action of the water pump 24. The water chamber is preferably, but not necessarily, cylindrical in shape.

Again referring to FIG. 1, the air separation chamber is designated as a unit by the numeral 30. The chamber 30 is mounted at a level above the fluid input 10, and a flow path exists between the input 10 and the air separation chamber 30. As the composite fluid enters the separator at the fluid input 10, the lighter air component, traveling conceptually along the arrow 50, tends to separate and flow into the region 52 of the elevated air separation chamber 30. Water can also enter the air separation chamber depending upon the fraction of water in the composite fluid (i.e. the water "cut" of the fluid), the volume input rate of the composite fluid, the rate that water is being purged from the water chamber by the water pump 24, and the rate at which air is purged from the air separation chamber 30 as will be discussed subsequently. As mentioned previously, the separated air is moist in the sense that it can still contains a significant amount of water in the form of vapor, mist or droplets.

The moist air within the air separation chamber 30 is forced to flow, by means of a serpentine path, through a condensate chamber 81 which is preferably formed by partitioning a portion of the air separation chamber 30. More specifically, the condensate chamber is defined by a portion of the wall of the air separation chamber 30, a baffle 36, and a top plate 72. Additional views, find a more detailed description of the condensate chamber 81, which can be thought of as a sub chamber within the air separation chamber, will be presented in following sections. The condensate chamber 81 contains material 42 which removes or "condenses" the remaining water from the moist air. The material 42 is preferably spongy, open cell spheres closely packed within the condensate chamber 81 to force, along with a baffle 40, the air to follow a tortuous, serpentine path. Moisture collects on the balls 42, and drains, under the force of gravity, to the bottom of the condensate chamber where it is removed by means of a drain 43 located at or near the lowest elevation of the condensate chamber 81. Dried air is then purged from the condensate chamber 81 portion of the air separation chamber 30 by means of a vacuum pump 82. The vacuum pump connects to the condensate chamber 81 by means of a suitable conduit 84, such as a hose or pipe, at an air outlet 80 which is positioned near the top of the condensate chamber. Connection is made preferably using industry standard flanges 83 and 83'.

As discussed previously, water in the contiguous liquid phase can enter the region 52 of the air separation chamber 30, depending upon input fluid water cut, input fluid volume rate, water output rate, and dry air output rate. If the level of this water were allowed to rise unchecked within the air separation chamber 30, it would eventually enter the condensate chamber 81 thereby negating the air drying properties of this chamber. To prevent this, a float 62 and valve arrangement 70 is employed within the air separation chamber 81. The float 62 slides upwardly and downwardly on guide rods 38 (only one shown in FIG. 1). The float is further contained by the baffles 34 and 36 and valve races which are depicted more clearly in FIG. 2a. Confined as described, the float 62 "rides" on the level of any water that might enter the air separation chamber 30. If the water level within the air separation chamber 30 rises above a predetermined level, the float 62 moves upwardly to an extent that it closes, by means of a valve 70, the flow path 90 between the region 52 of the main air separation chamber 30 and the condensate "subchamber" 81. This terminates moist air flow into the condensate chamber 81. More importantly, closure of the path 90 by the valve 70 prevents any contiguous water from flowing into the condensate chamber 81. Stated another way, flow from the separator input 10 into the region 52 of the air separation chamber 30 is temporarily halted after compression of air within the main air separation chamber 30 generates a back-pressure equal to the input fluid pressure. Flow is automatically restarted when the water pump 24 can purge sufficient water from the water chamber 14, the abnormally high water level within the air separation chamber 30 falls, and the position of the float 62 likewise moves downwardly such that the valve 70 opens the flow passage 90 between the region 52 of the main air separation chamber 30 and the condensate chamber 81.

The air separation chamber 30 is preferably cylindrical in shape, and tapers conically to a standard flange fitting at the separator input. Details of the float and valve assembly will be discussed in detail in a subsequent section of this disclosure. The separator is preferably about three feet in height and two feet in diameter. This results in a very light portable separator which, for its size, handles a very high volume of composite fluid. Essentially all moisture is removed from the separated as, which is air in the pervious discussion. The entire separator is inexpensive to fabricate as will become in the following detailed description of the preferred embodiments of the invention. There are few moving parts which minimizes maintenance costs and increases reliability. The separator is also very rugged and suitable for all types of harsh environment applications.

Figures 2A, 2B:
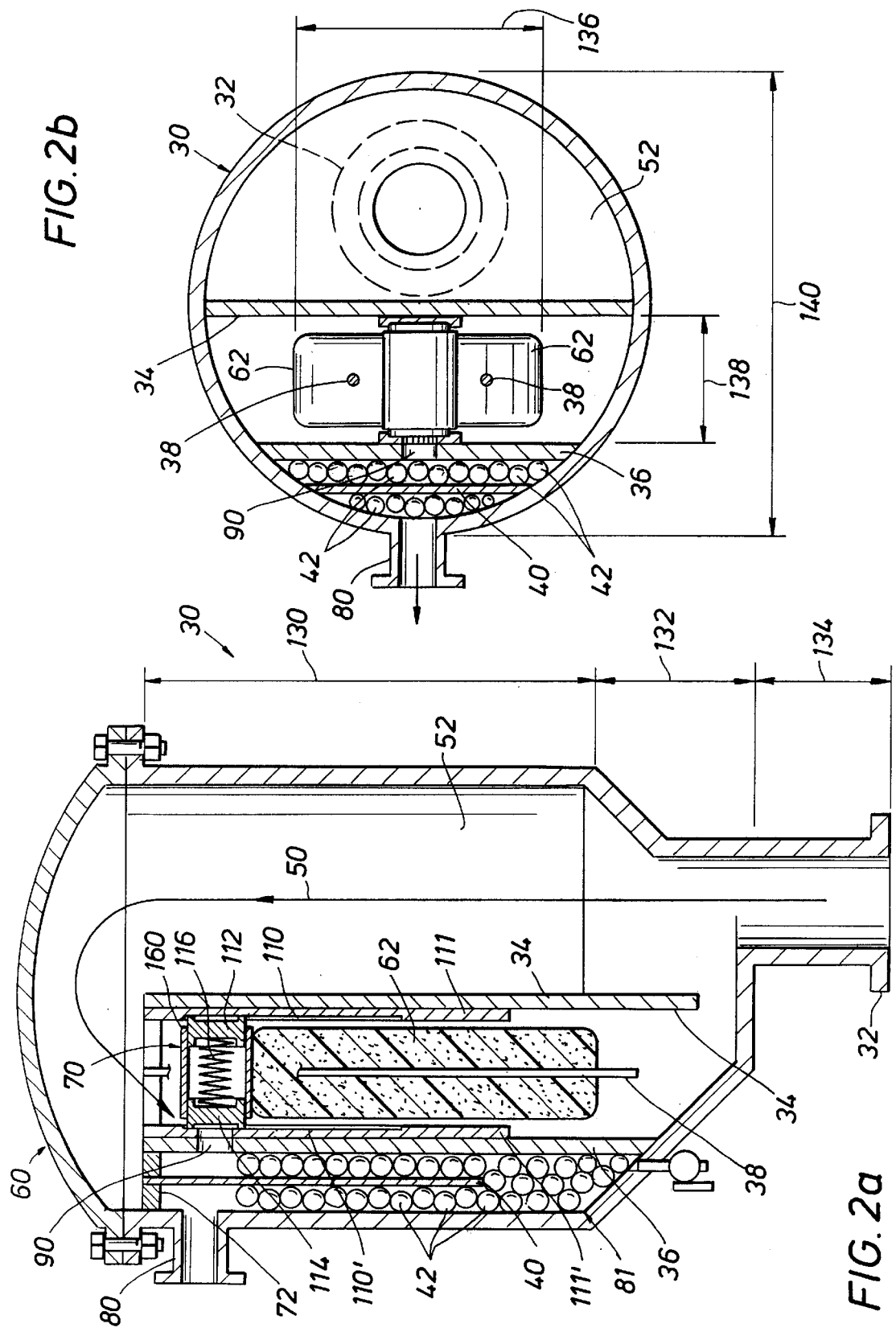
FIG. 2a is a more detailed side sectional view of the air separator chamber illustrating more clearly the float and valve arrangement.
FIG. 2b is a top sectional view of the air separator chamber.

FIG. 2a is a side view of the air separator chamber 30 and more clearly illustrates key components of the valve and float assembly. The valve 70 comprises two preferably circular pads 112 and 114 which are seated against the valve races 110 and 110' by the force of the compressed spring 116. The valve races 110 and 110' are recessed in race retainers 111 and 111' which, in turn are affixed to the baffles 34 and 36, respectively, which also confine the float 62. A cylinder 160 confines the pads and spring, and is affixed to the top of the float 62. As the float 62 is guided by the rods 38 and baffles 34 and 36, and moves up and clown with the water level within the air separator chamber 30, the valve pads 112 and 114 slide along their respective races 110 and 110'. In FIG. 2a, the position of the float is such that the valve pad 114 closes the passage 90 thereby restricting flow of moisture ladened air into the condensate chamber 81. Movement of the float and attached valve assembly is limited in the upward direction by the plate 72, and limited in the downward direction by the wall of the chamber 30.

The dimensions 130, 132, and 134 are preferably 24, 9 and 6 inches, respectively. The flange 32 is preferably a standard 6 inch flange, and is offset from the major axis of the air separator chamber by about 6 inches. The top of the chamber 30 is defined by a dome plate 60 which is designed to withstand internal vacuum applied to the chamber by the vacuum pump 82, and is preferably affixed to the cylindrical portion of the chamber by a bolted flange assembly as illustrated. It should be understood that the recited dimensions are typical, and they can be varied without significantly affecting the operation of the invention.

FIG. 2b is a top sectional view of the air separation chamber at the output 80 and passage 90. Here, the valve assembly 70 has been omitted for clarity. The two guide rods 38 upon which the float 62 slides are clearly shown in this view, and the positions of the baffles 34, 36 and 40 are further defined. The dimensions 136, 138, and 140 are preferably 12, 7 and 24 inches, respectively, but can be varied without significantly affecting the operation of the invention.

Figure 3:
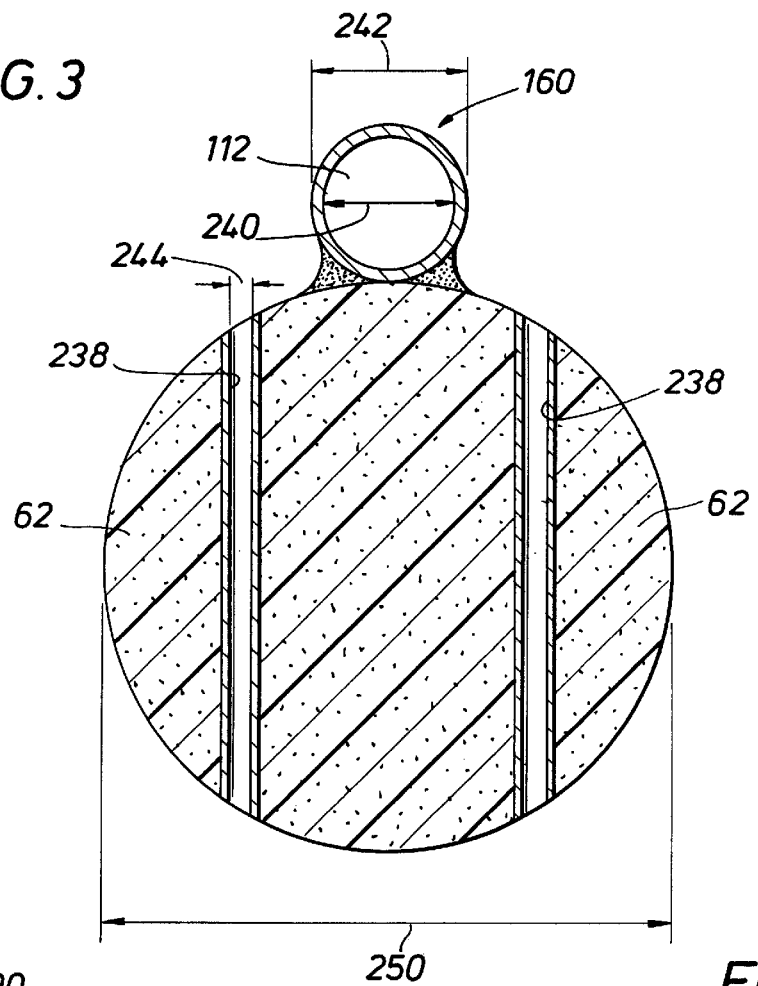
FIG. 3 is a front view of a disk shaped float and attached valve assembly.

FIG. 3 is a front view of the disk shaped float 62 and attached valve assembly cylinder 160. The float is preferably made from a closed cell foam material to produce the required buoyancy. The diameter 250 of the float disk is preferably 12 inches and the thickness of the disk is nominally 7 inches (see FIG. 2b). The float is penetrated by two guide rod tubes 238 which are preferably made from 3/8 inch stainless steel tubing with all inside diameter 244 sufficient large to receive preferably 1/2 inch guide rods 38 (see FIGS. 2a and 2b). The diameter 242 of the valve assembly 160 is preferably about 3½ inches and retains valve pads 112 and 114, each of which has a diameter 240 of about 3 inches. Again, it should be understood that these recited dimensions can be varied without significantly altering the performance of the invention.

Figure 4A:
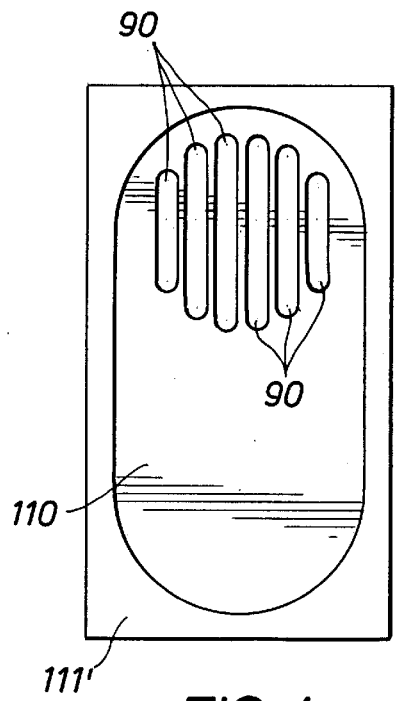
FIG. 4a is a front view of the valve race and slotted flow passage between the main region of the air separator chamber and the condensate chamber.

FIG. 4a is a front view of the valve race 110' which is recessed within the race retainer 111'. The valve races are preferably made from polyethylene or polypropylene. The input passage into the condensate chamber 81 is preferably a series of slotted openings 90 rather that a single opening. The "ribs" between the slotted openings 90 provide mechanical support to receive the force of the valve pad 114 exerted by the spring 116. Furthermore, the slots define essentially a circular "footprint" which is conveniently and fully covered by the circular valve pad 114 when the valve 70 is fully closed.

Figure 4B:
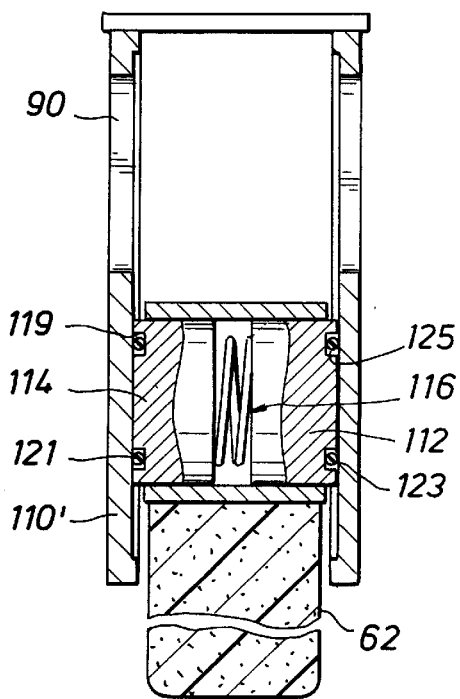
FIG. 4b is a side view of the valve assembly including valve disks, spring, and valve races.

FIG. 4b is a more detailed side view of the valve assembly 70 mounted on the float 62, where the valve assembly is positioned such that the passage 90 is open. The faces of the cylindrical valve pads 114 and 112 contact and seal with the valve races 110' and 110, by means of O-ring 121 and 123, respectively. The O-rings 121 and 123 are retained in peripheral O-ring grooves 119 and 125, respectively. Altered and improved sealing is provided in FIG. 4e which shows a second seal member 115. Not only is there an O-ring as before, a second seal 115 is received in a matching groove and supports a protruding lip forming a circular contact around the pad. The lip is biased into contact.

FIG. 4c is a front view of the valve disk 114 which clearly illustrates a peripheral O-ring grove 119. FIG. 4d is a side view of the valve pad 114 illustrating a spring seat 117 to receive one end of the spring 116. It should be understood that the geometry of the valve pad 116 is identical to the geometry of the valve pad 114.

In addition, the float valve operated equipment between the baffles 34 and 36 can be replicated serially with the valve opening into another condensate chamber 81 with a set of spheres 42. With two or more, the drying is better. Methods as disclosed above meet all of the stated objects of the present invention and provide a high volume, gas-liquid separator with features not available in the prior art.

While the foregoing is directed to the preferred embodiments, the scope thereof is determined by the claims which follow.

What is claimed is:

1. A method for separating a composite fluid into a water component and a dry air component, comprising the steps of:

(a) providing an inlet to receive said composite fluid;
   (b) connecting a water chamber to said inlet to enable at least a portion of said water component of said composite fluid to flow into said water chamber; and (c) connecting an air separation chamber to said inlet so that an air component of said composite fluid flows into said air separation chamber, wherein said air separation chamber comprises
  (i) a condensate chamber for said air component flow to separate said air component into said water component and said dry air component, wherein said air is flowed through a material, within said condensate chamber, in a serpentine path thereby separating said air into said water component and said dry air component, and wherein said dry air flows from an output of said condensate chamber,
  (ii) a float assembly which moves with a level of water within said air separation chamber, and
  (iii) a valve assembly which is conveyed by said float and which terminates the flow of said air into said condensate chamber, by closing an air flow path into said condensate chamber, when said water level within said air separation chamber reaches a predetermined level, wherein said valve assembly closes said air flow passage by blocking said flow passage with a valve pad.

2. The method of claim 1 wherein said material comprises open cell spheres.

3. The method of claim 1 further comprising the step of connecting a vacuum pump to said output of said condensate chamber, wherein the action of said vacuum pump causes air to flow into said air separation chamber.

4. A method for separating a composite fluid into a liquid component and a dry gas component, comprising the steps of
  (a) drawing said composite fluid into an inlet;
  (b) flowing said liquid component into a liquid chamber;
  (c) flowing said gas component into an air separation chamber comprising a condensate chamber into which said gas component flows, wherein said condensate chamber
    (i) comprises a serpentine path with at least one baffle, and
    (ii) removes liquid component in the form of vapor from said gas component thereby forming said dry gas component;
  (d) closing a gas flow path into said condensate chamber thereby terminating the flow of said gas into said condensate chamber when a level of said liquid component within said air separation chamber reaches a predetermined level;
  (e) pumping said dry gas component from said condensate chamber; and
  (f) opening said gas flow path into said condensate chamber thereby initiating the flow of said gas into said condensate chamber when said level of said liquid within said air separation chamber is less than a predetermined level.

5. The method of claim 4 comprising the additional step of draining said liquid component separated in said condensate chamber from said condensate chamber.

6. An apparatus for separating a composite fluid into a water component and a dry air component, the apparatus comprising:
  (a) an inlet to receive said composite fluid;
  (b) a water chamber connected to slid inlet to enable at least a portion of said water component of said composite fluid to flow into said water chamber; and (c) an air separation chamber connected to said inlet to enable an air component of said composite fluid to flow into said air separation chamber; and wherein said air separation chamber comprises
  (i) a condensate chamber for receiving an air component flow to enable separation of said air component into said water component and said dry air components
  (ii) a float assembly moving in response to the level of water within said air separation chamber, and
  (iii) a valve assembly operated by said float to selectively terminate the flow of said air into said condensate chamber, by closing an air flow path into said condensate chamber, when said water level within said air separation chamber reaches a predetermined level, wherein said valve assembly comprises
    a valve pad,
    a valve race comprising said flow path and along which said valve pad moves, and
    a spring movement bearing, against said valve pad to move said pad in said flow path for closure when said water level reaches said predetermined level.

7. The apparatus of claim 6 wherein:
  (a) said condensate chamber comprises material which condenses water from said air component thereby yielding said dry air component;
  (b) said material is packed within said condensate chamber such that said air flows through said condensate chamber following a serpentine path; and
  (c) said dry air flows from an output of said condensate chamber.

8. The apparatus of claim 7 wherein said material comprises open cell spheres.

9. The apparatus of claim 7 further comprising a vacuum pump which is connected to said output of said condensate chamber, wherein the action of said vacuum pump causes said flow of air through said air separation chamber.

10. The apparatus of claim 6 further comprising a water pump which is connected to an outlet of said water chamber and wherein the action of said water pump removes water from said water chamber and also removes water from said inlet and said air separation chamber.

11. The apparatus of claim 10 wherein said valve assembly opens said air flow path when the action of said water pump lowers said water level within said air separation chamber to at level below said predetermined level.

12. The apparatus of claim 6 wherein said float comprises closed cell material and wherein movement of said float is guided by at least one guide rod.

13. An apparatus for separating a composite fluid into a liquid component and a dry gas component, the apparatus comprising:
  (a) an inlet to receive said composite fluid;
  (b) a water chamber connected to said inlet so that at least a portion of said liquid component of said composite fluid flows into said water chamber; and
  (c) an air separation chamber connected to said inlet so that a gas component of said composite fluid flows into said air separation chamber, wherein said air separation chamber comprises
    (i) a condensate chamber for said gas component flow along a gas flow path, and said chamber further separates said gas component into said liquid component and at dry gas component, wherein said condensate chamber comprises means to condense liquid from said gas component, and wherein said condensate chamber is constructed and arranged so that said gas component flow in a serpentine path through said means thereby condensing liquid from said gas component, (ii) a valve assembly to end the flow of said gas into said condensate chamber, by closing said gas flow path, when the level of said liquid within said air separation chamber reaches a predetermined level, and (iii) a vacuum pump connected to said output of said condensate chamber, wherein said vacuum pump removes said dry gas from said condensate chamber.

14. The apparatus of claim 13 further comprising a liquid pump, wherein the action of said liquid pump removes said liquid component from said air separation chamber and said water chamber.

15. The apparatus of claim 13 wherein said material comprises closely packed, open cell spheres.

16. The apparatus of claim 13 wherein said condensate chamber comprises a drain valve through which said liquid component separated in said condensate chamber is drained from said condensate chamber.

* * * * *